United States Patent [19]
Rando

[11] Patent Number: 6,009,630
[45] Date of Patent: Jan. 4, 2000

[54] REFERENCE LASER PROJECTOR WITH OPTIONAL SELF-LEVELING MODE

[75] Inventor: Joseph F. Rando, Los Altos Hills, Calif.

[73] Assignee: LeveLite Technology, Inc., Mt. View, Calif.

[21] Appl. No.: 09/234,582

[22] Filed: Jan. 21, 1999

Related U.S. Application Data

[63] Continuation-in-part of application No. 09/063,877, Apr. 21, 1998.

[51] Int. Cl.[7] .................................. G01C 5/00; G01C 9/00
[52] U.S. Cl. .................................. 33/365; 33/227; 33/291
[58] Field of Search ............................... 33/365, 227, 228, 33/283, 286, 291, 354, 391, 402, 451, DIG. 21, 395, 398

[56] References Cited

U.S. PATENT DOCUMENTS

| | | |
|---|---|---|
| 4,043,679 | 8/1977 | George . |
| 4,221,483 | 9/1980 | Rando . |
| 4,852,265 | 8/1989 | Rando . |
| 4,912,851 | 4/1990 | Rando . |
| 5,075,977 | 12/1991 | Rando . |
| 5,184,406 | 2/1993 | Swierski ..................................... 33/227 |
| 5,519,942 | 5/1996 | Webb . |
| 5,524,352 | 6/1996 | Rando . |
| 5,531,031 | 7/1996 | Green . |
| 5,594,993 | 1/1997 | Tager et al. . |
| 5,782,003 | 7/1998 | Bozzo ..................................... 33/286 |

OTHER PUBLICATIONS

Brochure, Laservision 6.0, Zircon Corp., 1 p., (date unknown).
Brochure, Laser Level, Stabila, 2 pp. (date unknown).
Brochure, Finish–Line, David White, 4 pp. (date unknown).

*Primary Examiner*—Christopher W. Fulton
*Attorney, Agent, or Firm*—Thomas M. Freiburger

[57] ABSTRACT

A tool resembling a carpenter's level is used in establishing a precise level line and projecting an existing line using a visible laser beam projector in the same instrument. A manual selector device is provided for switching from a laser beam parallel to a reference surface to one which self-levels in one axis. Methods for switching between modes are described as well as a tilt compensator.

15 Claims, 11 Drawing Sheets

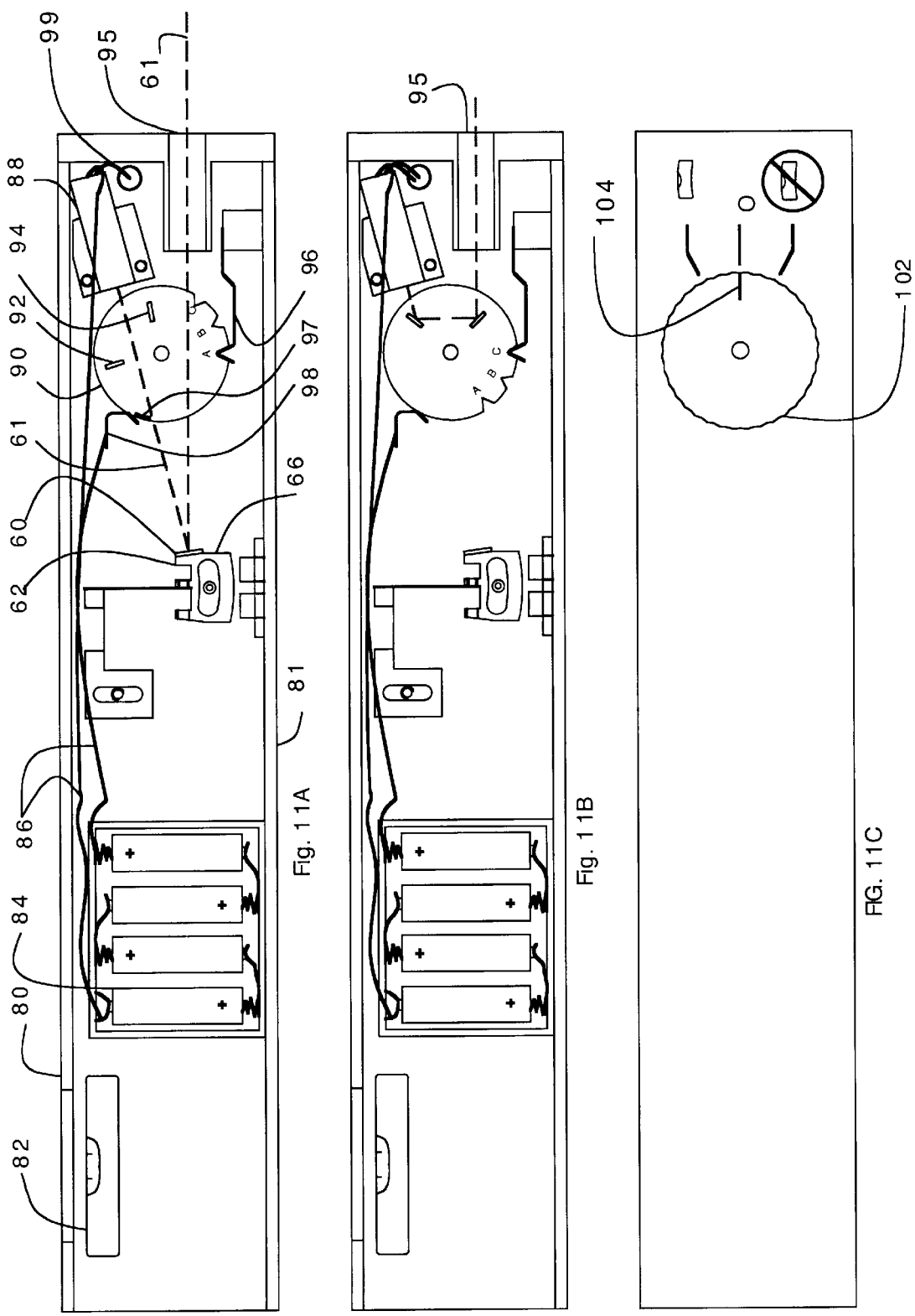

REFERENCE LASER PROJECTOR WITH OPTIONAL SELF-LEVELING MODE

This application is a continuation-in-part of application Ser. No. 09/063,877, filed Apr. 21, 1998, now abandoned.

BACKGROUND OF THE INVENTION

This invention relates to hand tools, and in particular the invention is concerned with a hand tool for projecting a reference beam and a level and/or plumb beam of visible light for precise alignment in the same tool.

For some time laser beams have been added to the conventional carpenter's level to provide a handy tool for projecting a level line and for extending an existing line. In the level application a carpenter's level has a collimated laser beam parallel to the reference surface. When a sprit level on the carpenter's level is leveled by the operator, the reference surface of the carpenter's level is made level and the beam is parallel to the reference surface. This manual leveling step requires the user's time, and its elimination would be a benefit.

In an important application, an existing line, a wall line, for example, is extended by pushing the tool's reference surface against the existing wall and marking the laser beam location. In a similar application, the extended path of a pipe or duct can be located by pushing the reference surface against the pipe or duct and observing the beam path. It is an objective of the invention to provide the benefits of these applications to the user in an instrument which can also generate a level beam despite small tilt of the instrument's housing. By combining a self-leveling feature with the reference line feature, the instrument is useful in a great number of construction and layout situations.

FIG. 1 shows a typical prior art carpenter's level 2 with a built-in laser which produces a beam 6 parallel to a reference surface 3. In use the reference surface is used to extend a line or the unit is leveled with a base or with shims until a sprit level 4 indicates level providing a level reference. This design allows the use of a penta prism accessory 8 to deviate an incoming beam 10 by precisely 90 degrees, producing an outgoing beam 12. The term "reference surface" as used herein to refer to beam projecting tools is meant to describe a linear surface, preferably elongated and accurately parallel to the laser beam produced by the instrument in non-self-leveling mode.

A compact laser instrument 13 with reference surfaces is described in U.S. Pat. No. 5,594,993 and pictured in FIG. 2. It does not have any self-leveling features.

Self-leveling laser beam projectors are in wide use today as a stand-alone tool as shown in FIG. 3, manufactured by LeveLite Technology of Mountain View, California and described in U.S. Pat. No. 5,524,352. A self-leveling laser without a reference surface is described in U.S. Pat. No. 4,852,265. This instrument can switch from a level to a plumb beam by mechanically moving two mirrors. It has no reference surface as that term is used here, because the beam does not remain parallel to any such surface.

Numerous self-leveling compensators are used in rotating lasers which generate a plane as in U.S. Pat. No. 4,221,483. These compensators operate in two axes. Construction laser instruments used primarily for pipe laying as in U.S. Pat. No. 4,043,679, level primarily in the horizontal plane. Both of these categories do not use a mechanical reference surface on the instrument.

SUMMARY OF THE INVENTION

In accordance with the invention, a tool resembling a carpenter's level is provided for use in establishing a precise level line and for projecting an existing line using a visible laser beam projector contained in the same instrument. Within the level tool is a self-leveling laser projector which preferably is accurate within about six degrees in either direction, within one axis, i.e. within a vertical plane essentially perpendicular to a surface on which the tool rests. The self-leveling feature can be switched out so that the same laser beam projects a line parallel to the tool's reference surface and thus parallel to the surface on which the instrument rests, when desired. This selection is accomplished using a manual selector device on the exterior of the tool.

The carpenter's level in one preferred embodiment has level vials to accommodate both level and plumb use of the tool; in plumb use, the laser beam is useful in the parallel, non-self-leveling mode.

In addition, the tool's laser projection device can have mirrors to project simultaneous horizontal and vertical beams, through two exit windows. In self-leveling mode with the tool's housing approximately horizontal, the tool projects two accurate beams, level and plumb. The two orthogonal beams are also useful in non-self-leveling mode.

Thus, in preferred embodiment an instrument capable of use in establishing a level or plumb line and capable of projecting a laser beam includes an elongated housing with a substantially linear reference surface for engagement against a floor, wall or other surface which is to be checked or referenced for level or plumb condition. A laser beam projector is within the housing and projects a culminated laser beam through an exit window of the housing. Self-leveling means in the housing compensates for tilt angles when the housing's reference surface is not truly level or plumb, to produce a projected beam through the exit window which is substantially truly level or plumb when desired. In addition, parallel projection means are included, for projecting the beam in an orientation parallel to the housing's reference surface, whether or not the reference surface is level or plumb, when desired. A manual device is included on the instrument's housing for selecting between the self-leveling mode and the parallel projection mode.

It is therefore among the objects of the invention to provide an improved construction or layout tool which in preferred embodiments combines a carpenter's level with a laser projector, with the operator having a choice as to projecting a level and/or plumb beam from the tool, in spite of a non-level surface on which the tool rests, or projecting a beam which is truly parallel to that surface. These and other objects, advantages and features of the invention will be apparent from the following description of preferred embodiments, considered along with the accompanying drawings.

DESCRIPTION OF THE DRAWINGS

FIG. 11A is a view in elevation, with cover removed, showing interior components of a preferred embodiment of an instrument capable of two mirror beam routing for non-self-leaving mode, but with the instrument shown in the self-leveling mode.

FIG. 11B is a view similar to FIG. 11A, showing two mirror beam routing in the non-self-leveling mode.

FIG. 11C is an elevation view of the instruments of FIGS. 11A–111B, with the cover on.

FIG. 12C Shows another preferred embodiment with the cover on.

DESCRIPTION OF PREFERRED EMBODIMENTS

Figure 1:
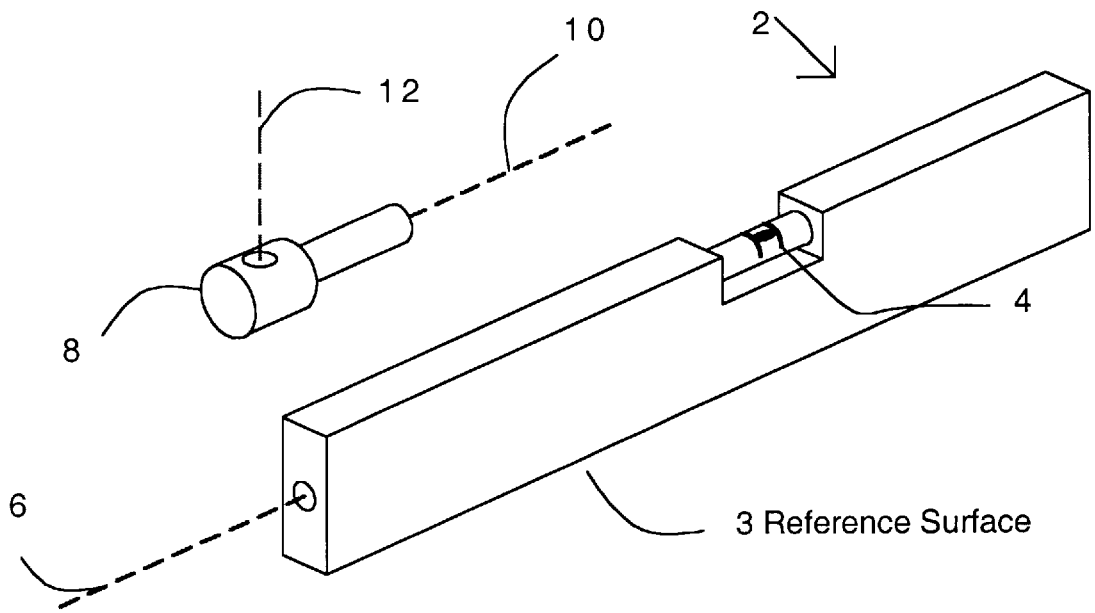
FIG. 1 is a perspective view showing a carpenter's level of the prior art with a built-in laser projector.
Figure 2:
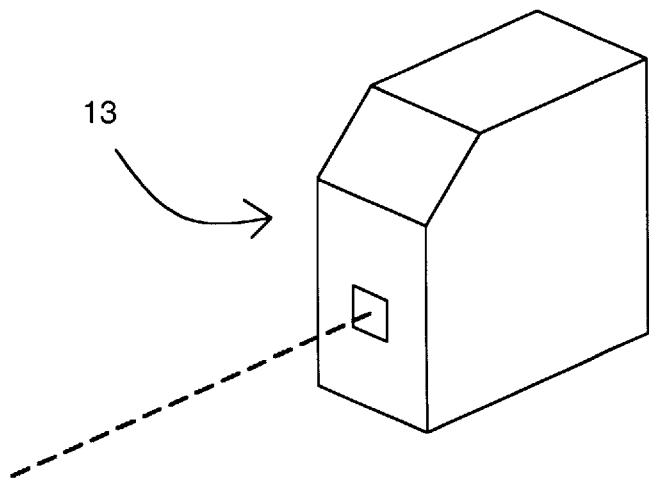
FIG. 2 is a perspective view showing a prior art compact laser projector with a housing having reference surfaces.
Figure 3:
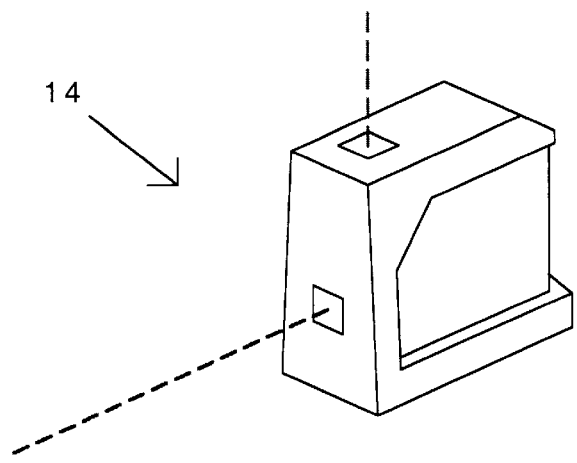
FIG. 3 is a perspective view of a prior art compact self-leveling laser projector.
Figure 4:
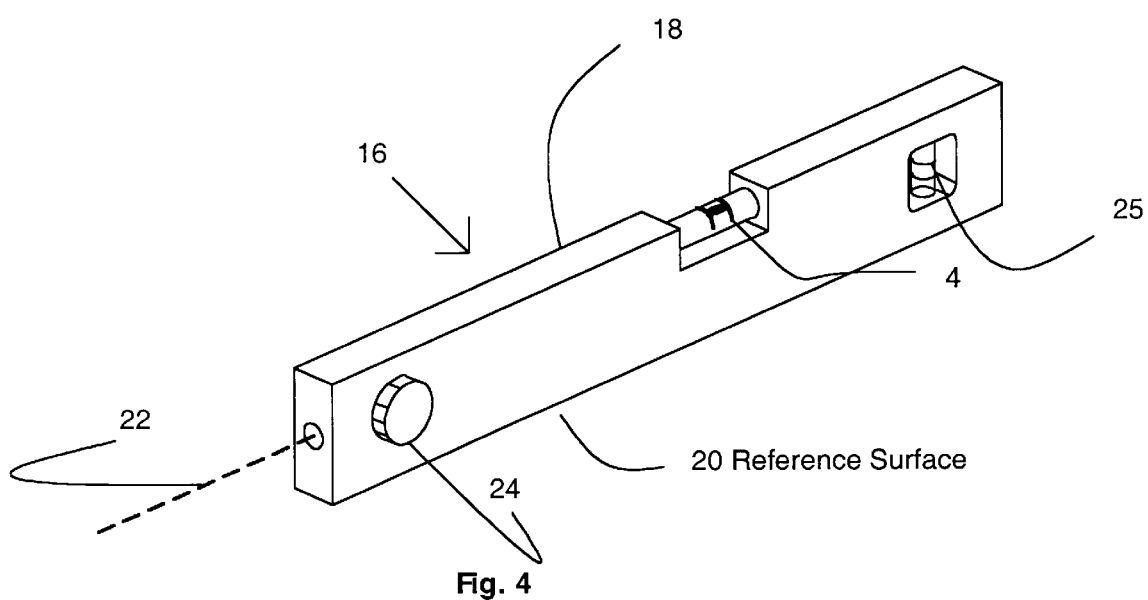
FIG. 4 is a perspective view of an instrument of the invention, showing a knob for switching modes of operation.

A preferred embodiment of the present invention is shown in FIG. 4. The instrument 16 consists of a housing 18 with a reference surface 20 in the shape of a carpenter's level. A laser within the housing projects a visible collimated laser beam 22 in two modes selectable by the user. The tool is approximately 40 cm. long or longer. A knob 24 is used to switch from the self-leveling to the non-self-leveling mode as well as to turn off the laser projector. In the non-self-leveling mode, the projected beam is parallel to the reference surface. A penta prism accessory (not shown in FIG. 4—see FIG. 1) may be used with the instrument in conjunction with the reference surfaces as is normal for carpenter's levels with lasers. In the self-leveling mode the visible laser beam is level even though the reference surface is not level, within a nominal range of approximately ±6 degrees.

FIG. 4 shows the level housing as having a first level vial 4 and a second level vial 25, for enabling the instrument to be used for level or plumb checking or layout in the normal manner of a carpenter's level. However, the instrument in other embodiments can include only the horizontal vial 4 or no level vial at all.

The beam 22 is useful in such operations as a line projector, non-self-leveling. The instrument can also be equipped to project two orthogonal beams, level and plumb and self-leveled when the tool is horizontal.

Figure 5:
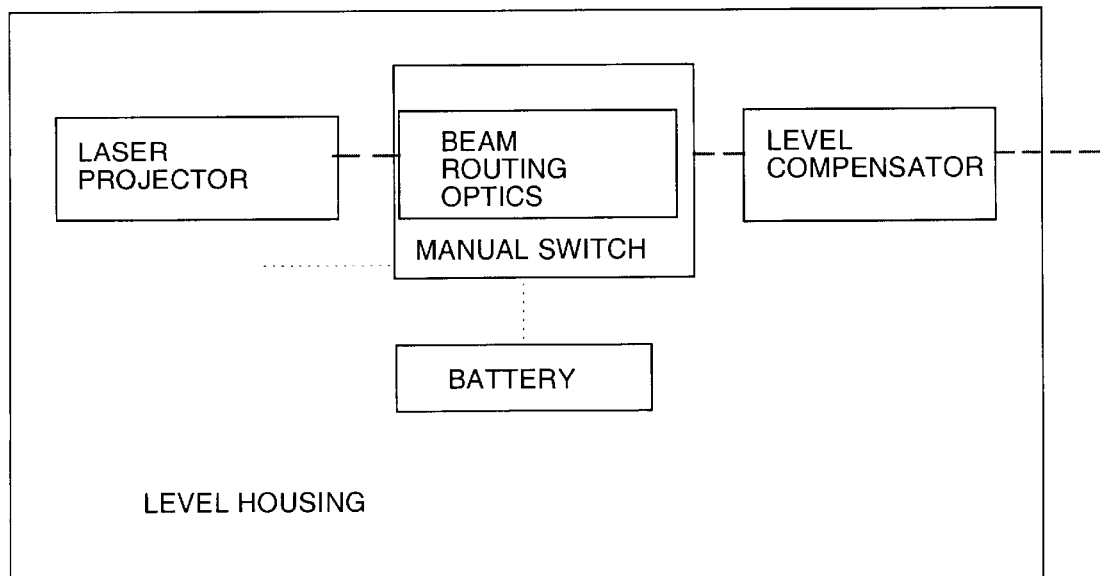
FIG. 5 is a block diagram indicating operation of the invention in a self-leveling mode.
Figure 6:
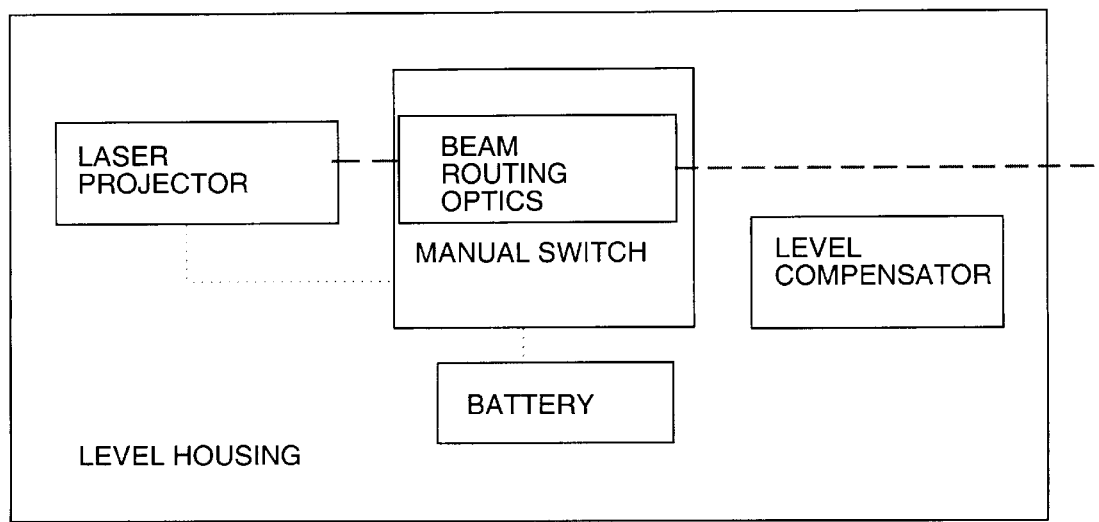
FIG. 6 is a block diagram indicating operation of the invention in a non-self-leveling mode.

The operation of the invention is shown in the block diagram of FIG. 5. The housing provides the reference surface and contains the battery, laser projector and beam routing optics. The manual switch and routing optics allow the beam to enter the level compensator as in FIG. 5 and exit the housing or to bypass the compensator and exit the housing as in FIG. 6.

An important aspect of the invention is the beam routing technique by which the self-leveling or non-self-leveling mode is selected. It is essential that the beam routing method be repeatable to a high degree of accuracy. Several designs provide the insensitivity to mechanical motion needed for high accuracy.

Figure 7:
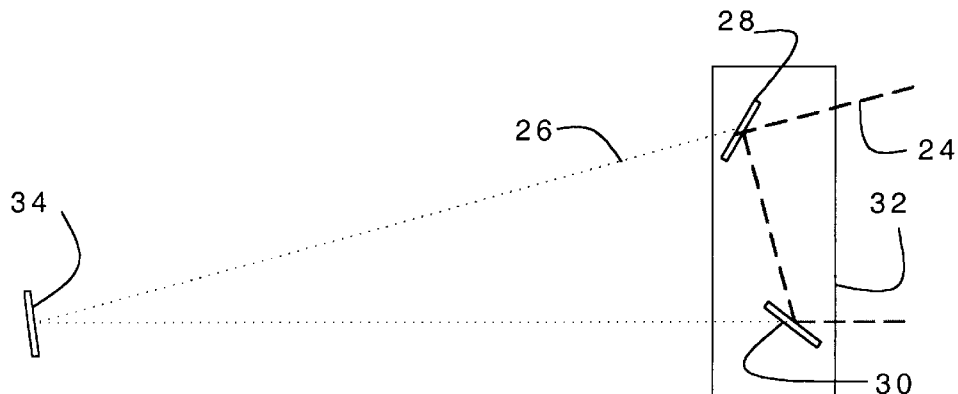
FIG. 7 is a schematic view demonstrating a method for routing a laser beam using two mirrors.

FIG. 7 shows how the beam routing can be accomplished using two mirrors. The path of the routed beam is shown by dashed lines 24 while the unrouted path is shown by dotted lines 26. The mirrors 28 and 30 are rigidly mounted to a carrier 32. The carrier may be slid or rotated out of the beam path to allow the beam to strike a compensating mirror 34, which compensates for a non-level tool. The slide mechanism for the carrier 32 is not shown but can be very rudimentary. Because of the laws of reflection the exit beam angle from the two mirrors 28 and 30 is insensitive to slight mechanical inaccuracies of the slide motion.

Figure 8:
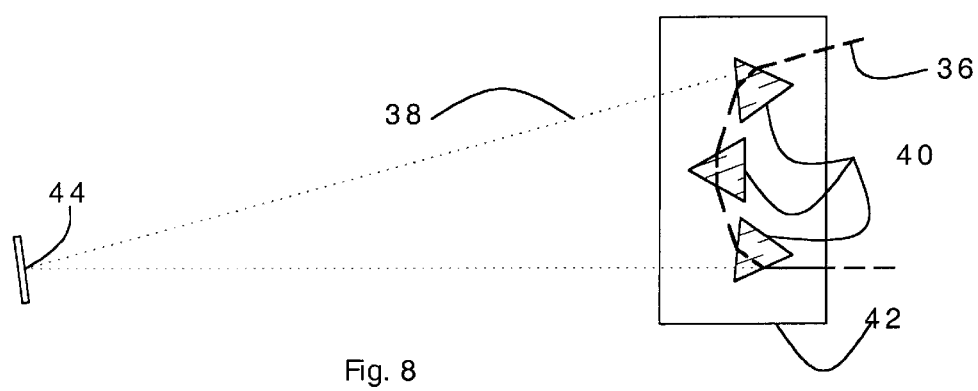
FIG. 8 is a schematic view showing a method for routing a laser beam using prisms.

FIG. 8 shows how the beam routing can be accomplished with prisms. The path of the routed beam is shown by dashed lines 36 while the unrouted path is shown at 38. The prisms 40 are rigidly mounted to a carrier 42. Because of Snell's law the exit beam angle is insensitive to slight mechanical motions of the slide. The prism angles are designed to be near the prism angle of minimum deviation to obtain the greatest insensitivity of mechanical motion of the slide. As with the system of FIG. 7, the carrier may be slid or rotated out of the beam path to allow the beam to strike the compensation mirror 44.

Figure 9:
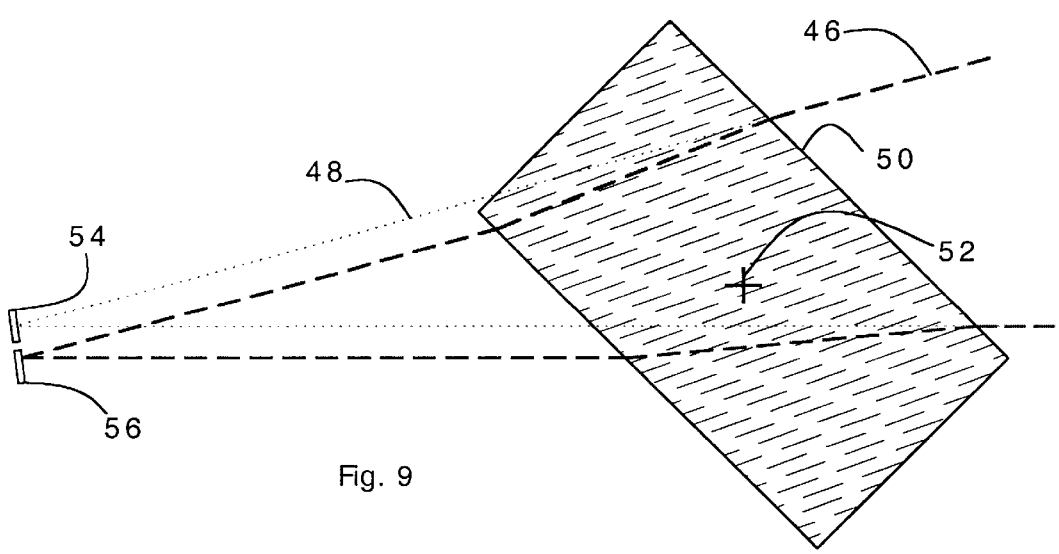
FIG. 9 shows a method for routing the beam using a block of glass or plastic.

FIG. 9 shows how the beam routing can be accomplished using a parallel block 50 of plastic or glass. The path of the routed beam is shown by dashed lines 46 while the path of the unrouted beam is shown at 48. The plastic or glass block can be slid in or out of the path of the beam, as in FIGS. 7 and 8. Because of Snell's law there is an offset of the beam when it passes through the block. When the beam is not routed it strikes a compensator mirror 54 which compensates for an off-level condition. When the beam is routed as shown by the dashed lines 46, the beam strikes a fixed mirror 56 which directs the beam out of the housing without tilt compensation. This method is attractive because if the faces of the block are parallel, the beam deviation through the block is totally insensitive to the motion of the block in both axes. The reflection losses at the block surfaces may be minimized by orienting the direction of polarization of the laser. The block 50 more preferably is rotated to two different positions to switch on or off the self-leveling mode, by rotation about its center 52. In this way the block will route the beam through one of two paths. This is described below with reference to FIGS. 12A to 12C.

Figure 10:
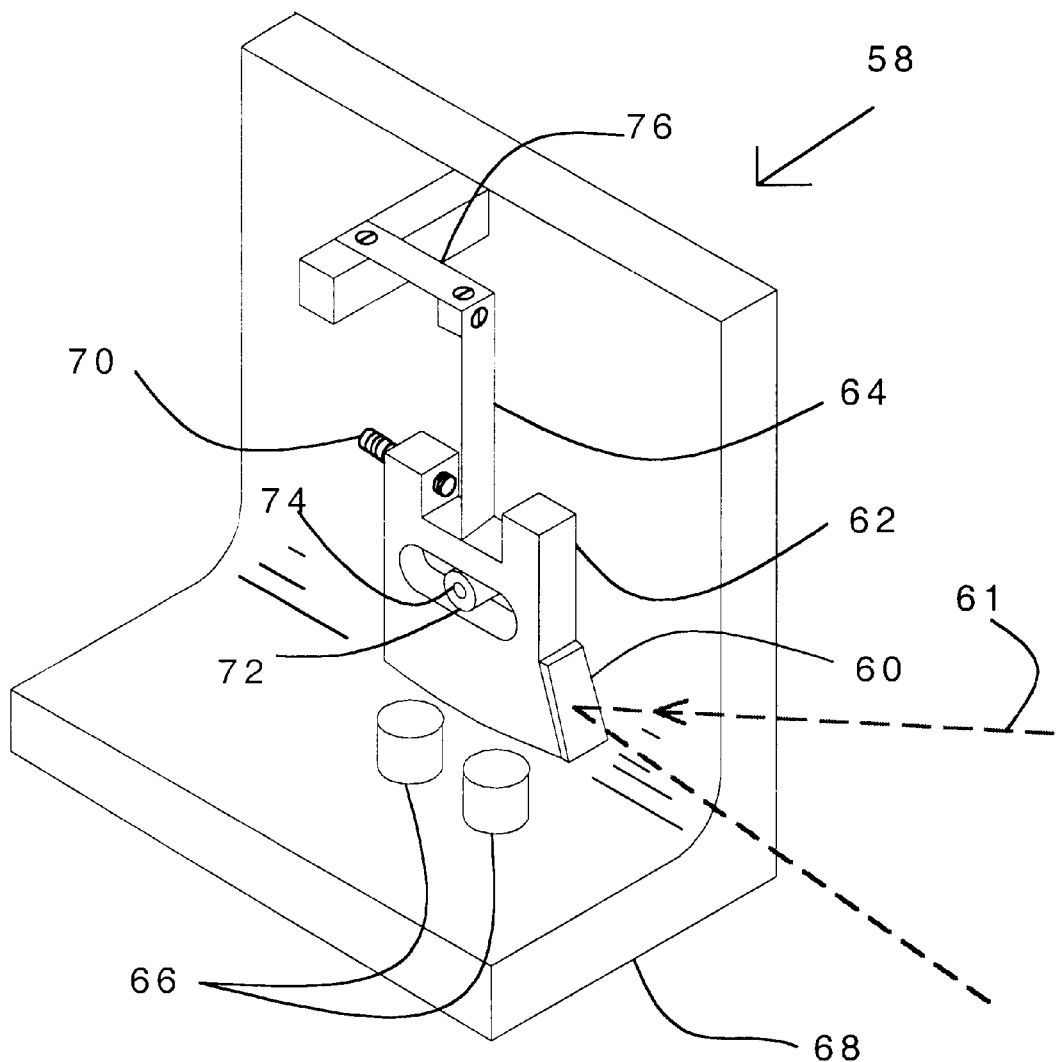
FIG. 10 is a perspective view showing a single mirror laser beam compensator using a cantilever beam.

A preferred form of compensator 58 is shown in FIG. 10 and uses a mirror 60 on a pendulum 62 mounted on a bending beam 64 to direct the visible laser beam 61 to level when the housing is not level. The pendulum is made of a material with high conductivity to allow magnets 66 to damp the pendulum oscillation via eddy current damping. The stiffness of the bending beam 64 is chosen to allow the pendulum to deflect half of the tilt angle, as in the compensator described in Rando U.S. Pat. Nos. 4,852,265, 4,912,851 and 5,075,977, which are incorporated herein by reference. For example, if the platform is tilted 2 degrees from level in the beam direction, the pendulum will deflect 1 degree. The beam stiffness is determined by the thickness of the beam 64, its width, length and material. Because of the laws of reflection, the reflected beam will have gone through a 2 degree correction and will be level. The bending beam is very stiff in the orthogonal direction and will not deflect. The laser beam will then continue to be aligned in the plane of the housing.

To fine calibrate the laser beam 61, the center of gravity of the pendulum 62 may be shifted slightly using a set screw 70. To provide shock resistance to the mechanism, a rubber hose 72 over a metal pin 74 absorbs the shock encountered in handling and dropping. A cantilever beam 76 supports the pendulum and allows the pendulum to bottom out on the rubber hose to avoid possible damaging shocks to the bending beam.

FIG. 11A shows an entire embodiment of the invention. A sprit level or level vial 82 is mounted to the chassis 80 which contains the lower, linear reference surface 81. Batteries 84 are connected by wires 86 to a laser projector 88 which projects the beam 61. The projector contains all the elements necessary to generate and project a collimated visible laser beam. A turntable 90 controls beam routing and electrical switching. Two mirrors 92 and 94 are mounted on the turntable 90, and are used to route the beam to the exit window 95 in FIG. 11B.

As stated above, the tool of the invention can be equipped to produce simultaneously a plumb and a level beam if desired. This can be in accordance with the system described in U.S. Pat. Nos. 4,852,265 or 4,912,851 (incorporated by reference herein), with the two beams being self-leveled only when the level tool is used horizontally; or a system such as described in U.S. Pat. No. 5,075,977 could be used, producing a self-leveled horizontal beam when the tool is used horizontally, or a self-leveled plumb beam when the tool is used vertically.

A spring latch member 96 allows the turntable to stop and be held at positions A, B and C. FIG. 11A shows the turntable in the A position with the self-leveling feature engaged; FIG. 11B shows the turntable in position C with the self-leveling feature by-passed; the B position, shown only in FIG. 11C, is "off".

To control the on/off status of the laser projector 88, a conductor member 98 makes electrical contact with the turntable 90 except in an insulated area 97. In positions A and C the current path for the plus voltage is through the spring member 98, the turntable, the housing or chassis, and through the plus lead of the laser projector as indicated at 99. The negative lead is connected continuously.

FIG. 11C shows an external knob 102 which is connected to the turntable. An indicator 104 on the knob shows in what mode the unit is operating: self-leveling, non-self-leveling or off.

Figure 12A:
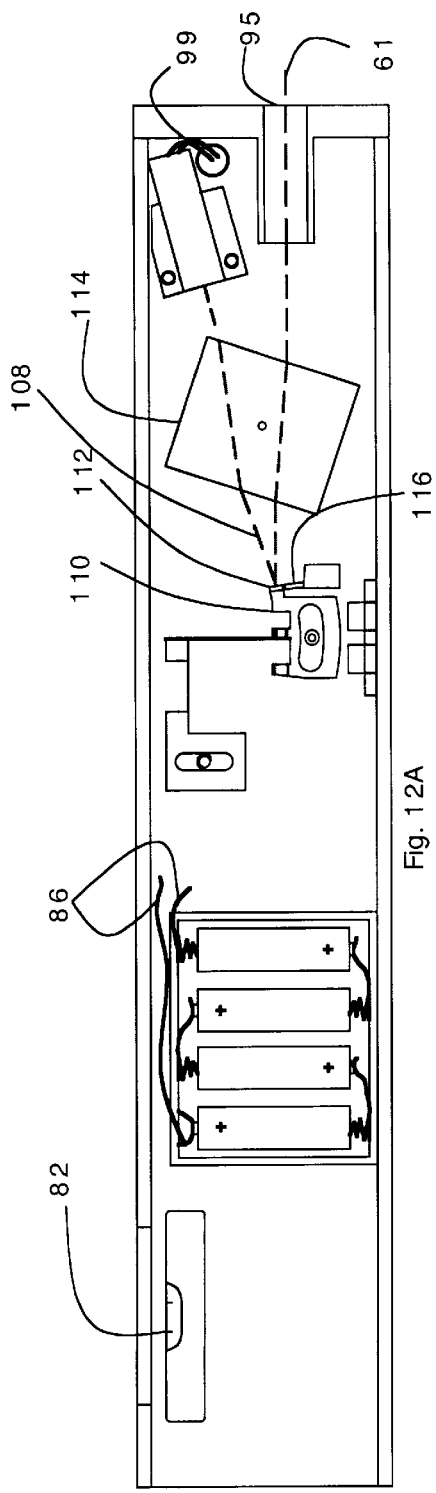
FIG. 12A shows another preferred embodiment of an instrument with cover removed and with a glass or plastic block in the self-leveling mode.
Figure 12B:
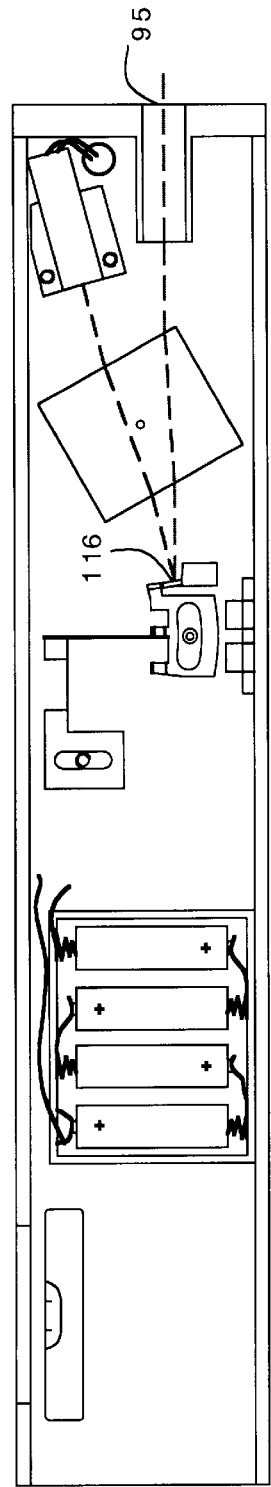
FIG. 12B shows the instrument of FIG. 12A with the glass or plastic block routing the beam in the non-self-leveling mode.
Figure 12:
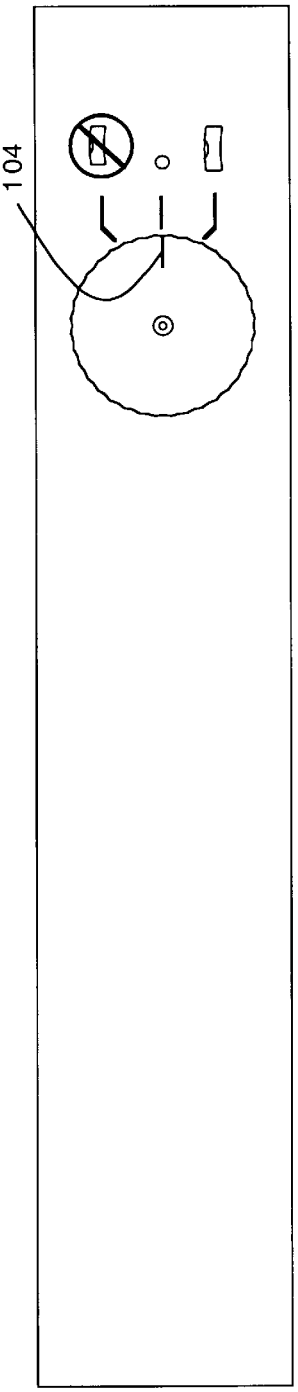

FIG. 12A shows how a beam 108 may be routed using a block 114 of plastic or glass by rotation. This figure is very similar to 11A. The block is on a turntable, not shown, and may be rotated between three positions as in FIG. 11A. The turntable commutator and position elements of FIG. 11A are not shown, and the electrical leads 86 are only partially shown, but the switching can be similar to that of FIG. 11A. The self-leveling mode is shown in FIG. 12A. The beam 108 passes through the block and strikes a mirror 112 mounted on a pendulum 110. Shock mounting and damping are similar to what is shown in FIG. 11A. In FIG. 12B the block is in the non-self-leveling mode. Because of the refraction in the block and the angles between the beams and the block the beam strikes a fixed mirror 116, which is independent of the pendulum 110, and exits the housing parallel to the reference surface.

Figure 13:
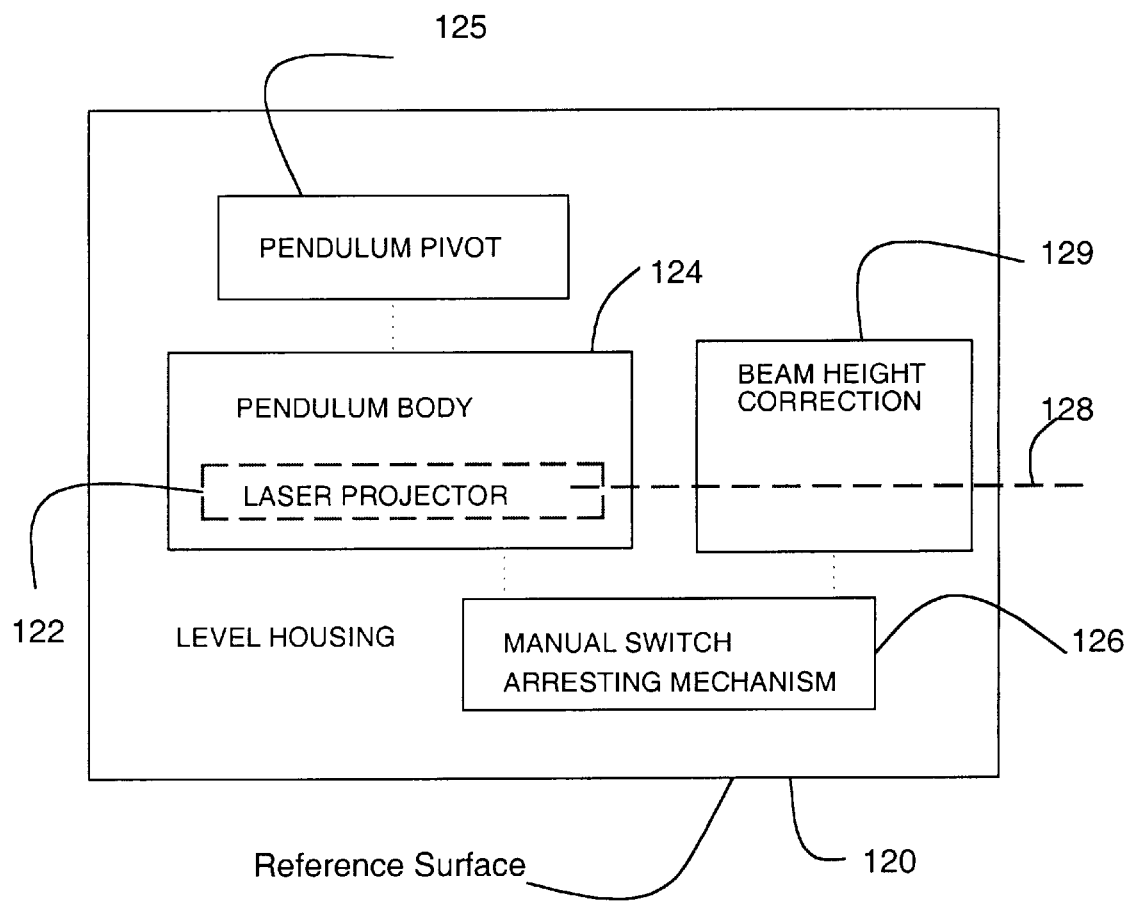
FIG. 13 is a schematic, block diagram view showing principles of another embodiment of the invention.

The operation of an alternate preferred embodiment is shown in the block diagram of FIG. 13. The level housing has a reference surface 120 and contains the battery, pendulum, and switching details. A laser projector 122 is mounted to the pendulum body 124. The pendulum is supported by a pivot 125 which may be a precision ball bearing, a weak spring or some other means. The pendulum hangs plumb or near plumb under force of gravity in the self-leveling mode. A manual switch 126 is used to achieve the non-self-leveling mode. In this mode the switch mechanically arrests the pendulum motion and positions it in a precise fashion so that the beam is parallel to the reference surface 120. In embodiments where the beam center at the exit 128 is translated by the switch to non-self-leveling mode, a height correction mechanism 129 can bring the beam height to the same location as in the self-leveling mode of operation through the action of the same mechanical switching mechanism.

Figure 14:
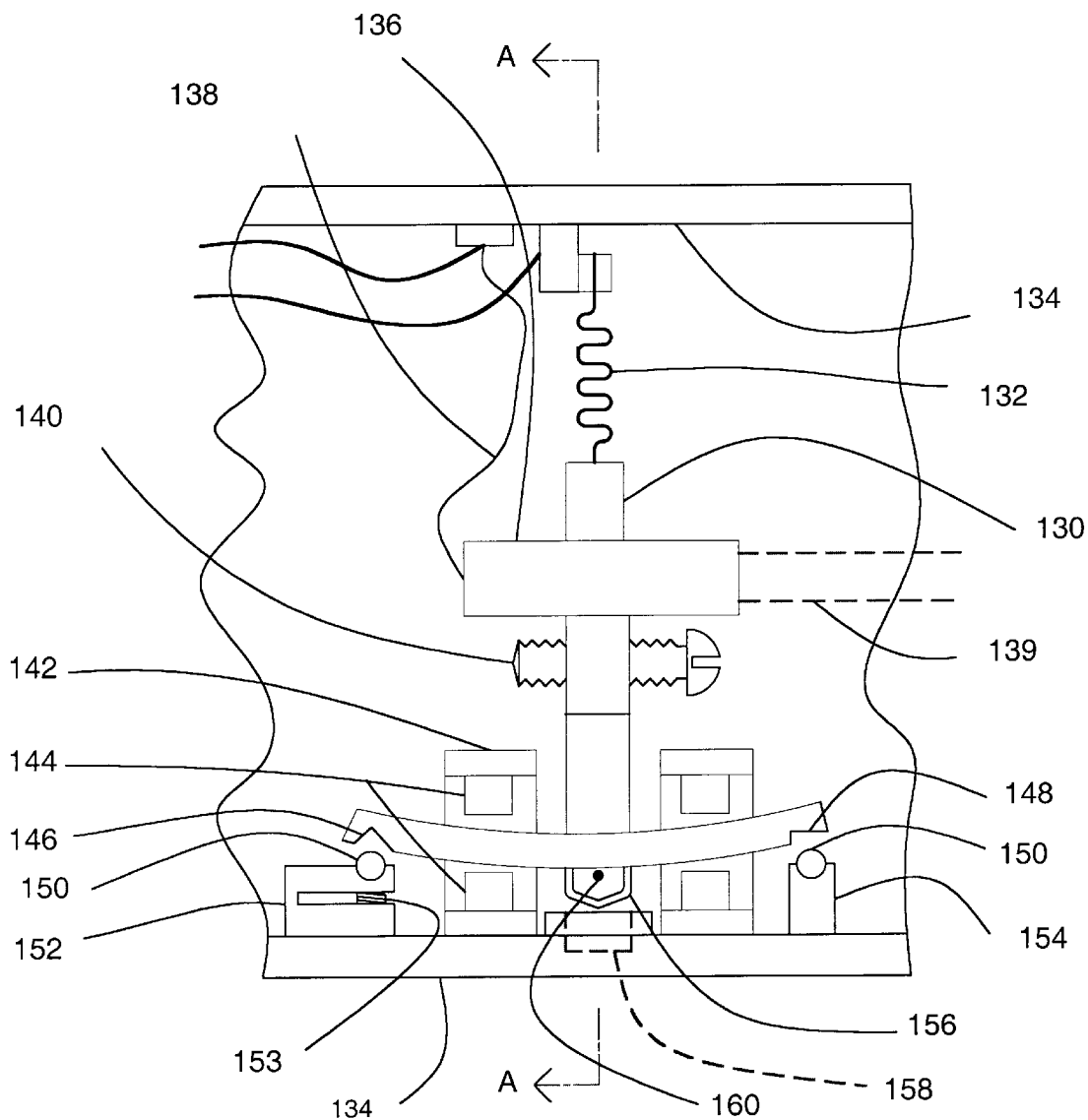
FIG. 14 is a sectional view showing, somewhat schematically, a portion of the interior of an instrument embodying the principles of FIG. 13.

FIG. 14 shows a preferred embodiment of the level of the FIG. 13 system with the mechanism exposed. A pendulum 130 is supported by a spring member 132 from the housing 134. A corrugated spring is shown but a coiled extension spring or bearing system could also be used here. A laser projector 136 is mounted within the pendulum 130 and power is supplied by one or more fine wires 138 which are too weak to affect the pendulum motion. One of the two electrical connections required could be through the spring. A calibration screw 140 is used to shift the center of gravity of the pendulum to adjust the projected laser beam 139 to true level in self-leveling mode. The pendulum motion is damped by Eddy currents created by a magnetic field. A pole piece 142 supports two magnets 144 on each side of the pendulum to create the magnetic field. The pendulum swings freely with no physical contact except the support and fine wires.

In the non-self-leveling mode a pin 160 is forced down making contact with a loop 156 on the pendulum. The suspension spring member 132 is extendable allowing the pendulum to be pulled down. Two pins 150, one on either side of the pendulum, act as precision rest stop surfaces and make contact with the pendulum at receptor surfaces 146 and 148. The loop 156 fits in a socket 158 which directs the pendulum 130 to the center of the housing while seating the pendulum at 146 and 148. When the pin 160 is in its lowered position (not shown) the pendulum is registered in the non-self-leveling mode generating a beam parallel to the housing. The exact position of the arrested pendulum can be adjusted by a member 152 which has an adjustment screw 153, preferably accessible from outside the housing 134.

There are many other methods of arresting motion of the pendulum and positioning it accurately so that the beam parallels the housing 134. For example, the pendulum could be pushed up instead of down, reversing the points of contact. The pendulum could be pushed in or out without changing the nature of the arresting and positioning mechanism. If a ball bearing is part of the pivot, arresting the pendulum becomes much simpler because one point on the pendulum is fixed, as in FIG. 19, described below.

Figure 15:
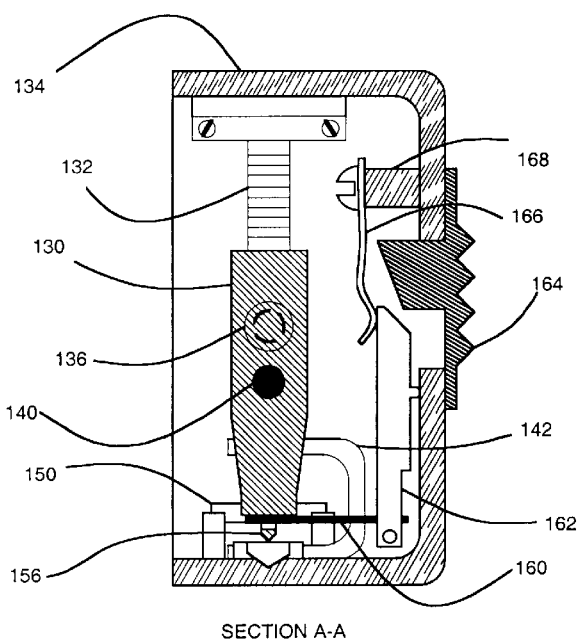
FIGS. 15 and 16 are sectional elevation views showing portions of an instrument as in FIGS. 13 and 14.
Figure 16:
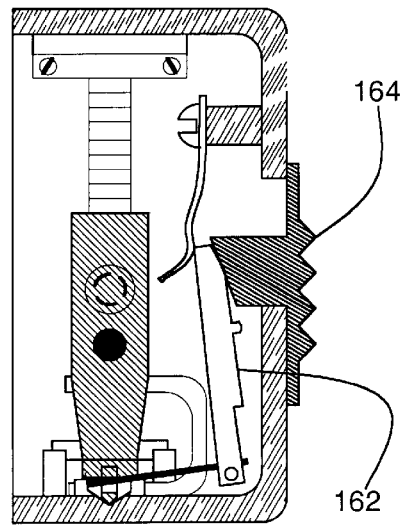

FIGS. 15 and 16 are end cross-sections showing how a switch and lever can be used to force the pendulum against the mechanical stops for registration, in one preferred embodiment. The numbers correspond to the same items as in FIG. 14. FIG. 15 shows the switch 164 in self-leveling mode, with a lever 162 holding the affixed pin 160 in an upper position as in FIG. 14, not contacting the pendulum. A spring 166 holds the lever 162 in this position. FIG. 16 shows the same switch mechanism except the switch has been activated to reposition the pendulum in the locked down position.

Figure 17:
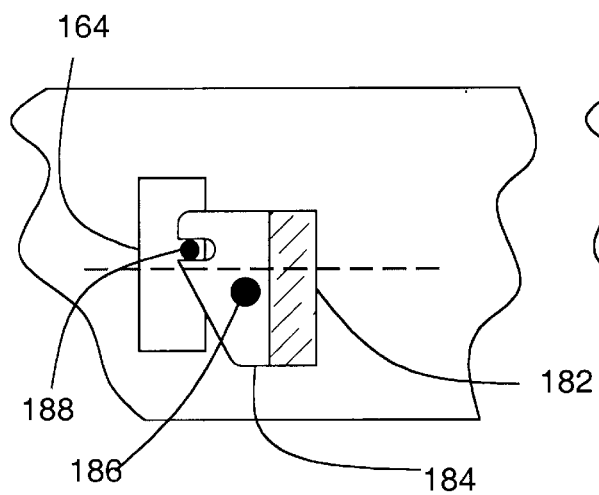
FIGS. 17 and 18 are schematic elevation views showing an off-set correction device which can be incorporated in the embodiments of FIGS. 13–16.
Figure 18:
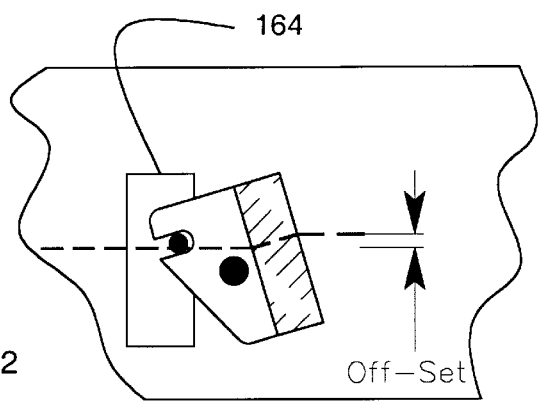

In embodiments such as just described above where the height of the beam changes as a result of arresting the pendulum's motion, the beam can be restored to its original position without affecting the angle by tilting a window. This is shown in FIGS. 17 and 18. A window 182, i.e. a transparent plate, is mounted on a rotating bracket 184 which pivots about a pin 186. The switch 164 for converting the mode from self-leveling to non-self-leveling has in it a pin 188 which controls the rotation of the bracket 184. When the switch is in the down or non-self-leveling mode the window is tilted a precise amount. The resulting beam off-set is approximately one third the window thickness times the tilt angle in radians, for a window of either glass or plastic. FIG. 18 shows the bracket in the tilted down position with the beam off-set indicated.

Figure 19:
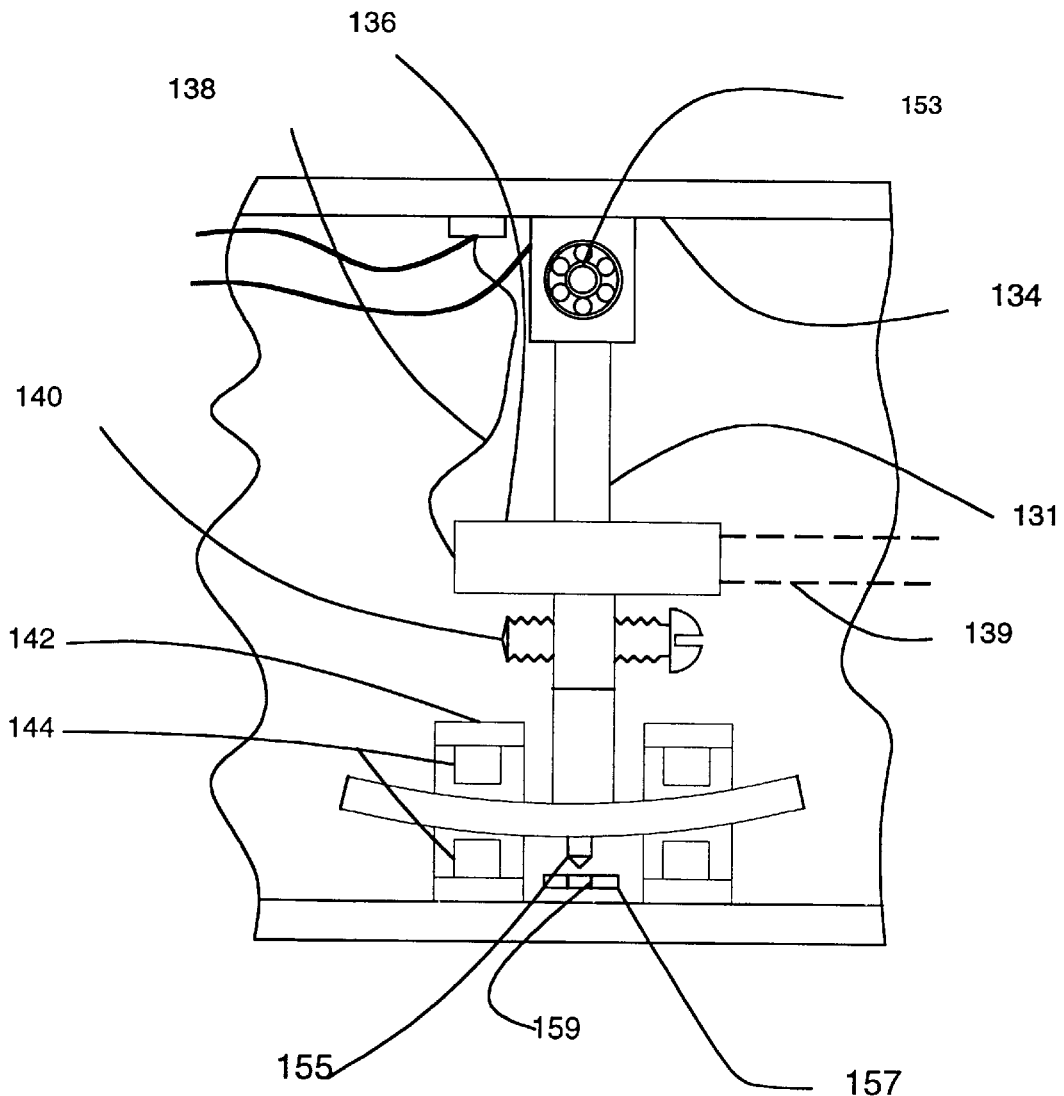
FIG. 19 is a sectional elevation view, somewhat schematic, showing a portion of another instrument, demonstrating another embodiment of the invention.

An alternate preferred embodiment is shown in FIG. 19. A pendulum 131 is supported by a fine ball bearing 153 from a housing 134. A collimated laser projector 136 projects a level beam 138. A fine wire 138 carries current to the laser projector. A leveling screw 140 is used to adjust the pendulum's center of gravity in order that the beam 139 is level. The pendulum motion is damped by Eddy current damping. Magnets 144 in pole pieces 142 produce the required magnetic field. When the non-self-leveling mode is required, a plate or latch device 157 is moved up by a mechanical lever, not shown, but similar to the lever of FIGS. 15 and 16. The pin 155 fits snugly in a hole 159 in the plate 157. This action initiates the non-self-leveling mode.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A carpenter's level instrument capable of use in establishing a level or plumb surface or line and capable of projecting a laser beam, comprising:
   an elongated housing with a substantially linear reference surface for engagement against a floor, wall or other work surface which is to be checked or referenced for level or plumb condition,
   the housing having at least one level vial with a level bubble for indicating a level or plumb condition of the reference surface on the housing,
   an exit window in the housing, and laser beam projector means within the housing for projecting a collimated laser beam through the exit window,
   self-leveling means in the housing for compensating for tilt angles when the housing's reference surface is not truly level or plumb, to produce a projected beam through said exit window which is substantially truly level or plumb, when desired,
   parallel projection means for projecting the beam in an orientation parallel to the housing's reference surface, whether or not the reference surface is level or plumb, when desired, and
   manual selection means on the instrument's housing for selecting between said self-leveling means and said parallel projection means.

2. The instrument of claim 1, wherein the housing has two level vials, one positioned for horizontal use of the tool and one positioned for vertical use of the tool.

3. The instrument of claim 1, wherein the housing includes two exit windows positioned for projection of orthogonal vertical and horizontal beams, with the self-leveling means being effective to compensate for tilt conditions of the instrument when the reference surface of the housing is roughly horizontal to produce simultaneous level and plumb beams projected from the instrument.

4. The instrument of claim 1, wherein the laser beam projector means includes a laser diode producing a beam, and wherein the self-leveling means comprises pendulum means supporting a reflecting mirror in an oblique position, the mirror being positioned to receive the beam from the laser diode means when said self-leveling means is selected and to reflect the beam horizontally, and the pendulum means including gravity responsive means for effecting compensation of the beam, generally within a plane including the beam incident and reflected from said reflecting mirror.

5. The instrument of claim 4, wherein the pendulum means comprises a thin metal band connected at its upper end to the housing and having a weight portion at its lower end, the band depending vertically so as to bend in response to gravity, the reflecting mirror being mounted near the lower end of the pendulum means, and the pendulum means being so calibrated as to respond to tilt of the housing by gravity acting on the weight portion, to correctly compensate for the tilt of the housing.

6. The instrument of claim 4, wherein the manual selection means comprises a rotatable knob on the housing's exterior and a connected turntable within the housing, with two mirrors affixed to the turntable, and the turntable having a first rotational position in which the two mirrors intercept the beam from the laser diode and reflect it out the exit window parallel to said reference surface without the beam striking the reflecting mirror of the self-leveling means, serving as said parallel projection means, and a second rotational position wherein the beam is not affected by the two mirrors and strikes the reflecting mirror of the self-leveling means.

7. The instrument of claim 4, wherein the manual selection means comprises a rotatable knob on the housing's exterior and a connected turntable within the housing, with a light-transmissive block affixed to the turntable, and the turntable having a first rotational position in which the transmissive block directs the beam from the laser diode in a direction such that the beam does not strike the reflecting mirror of the self-leveling means, and a second rotational position wherein the transmissive block directs the beam from the laser diode to strike the reflecting mirror of the self-leveling means such that the beam exits the housing corrected for tilt of the housing, and further including a fixed mirror within the housing, in the path of the laser beam as directed by the transmissive block in said first rotational position of the turntable, the fixed mirror being positioned so as to project the beam out of the housing parallel to said reference surface, serving as said parallel projection means.

8. The instrument of claim 1, wherein the self-leveling means includes a pendulum suspended in the housing, the laser beam projector means being mounted on the pendulum, and the parallel projection means comprising mechanical means for selectively locking the pendulum in a fixed position wherein the beam is parallel to the reference surface, said manual selector means being operable to engage said mechanical means when desired.

9. The instrument of claim 8, wherein the pendulum includes an extendable suspension spring connected to the housing, and the mechanical means comprising lever means connected to the manual selector means for engaging and pulling down the pendulum when parallel projection is desired, and including registry receptor surfaces on a lower side of the pendulum and corresponding precision rest stop surfaces connected to the housing below the pendulum, such that when pulled down the pendulum seats with its registry receptor surfaces firmly against the precision rest stop surfaces, establishing parallel projection of the beam.

10. The instrument of claim 9, further including off-set means connected to the manual selector means for shifting the height position of the beam within the housing back essentially to the beam height that exists when the instrument is self-leveling and the pendulum is freely suspended in the housing, thus correcting for change in beam height due to pulling down of the pendulum for said parallel projection means.

11. The instrument of claim 10, wherein the off-set means comprises a transparent plate within the housing in the path of the beam, connected to the manual selector means so as to change the angular orientation of the plate relative to the beam when the parallel projection means is selected, so as to shift the height of the beam exiting the plate.

12. A portable instrument capable of use in establishing a level or plumb surface or line and capable of projecting a laser beam, comprising:

a housing with a substantially linear reference surface for engagement against a floor, wall or other work surface which is to be checked or referenced for level or plumb condition or a line from which is to be projected, an exit window in the housing, and laser beam projector means within the housing for projecting a collimated laser beam through the exit window, self-leveling means in the housing for compensating for tilt angles when the housing's reference surface is not truly level or plumb, to produce a projected beam through said exit window which is substantially truly level or plumb, when desired, parallel projection means for projecting the beam in an orientation parallel to the housing's reference surface, whether or not the reference surface is level or plumb, when desired, and manual selection means on the instrument's housing for selecting between said self-leveling means and said parallel projection means.

13. The instrument of claim 12, wherein the self-leveling means includes a pendulum suspended in the housing, the laser beam projector means being mounted on the pendulum, and the parallel projection means comprising mechanical means for selectively locking the pendulum in a fixed position wherein the beam is parallel to the reference surface, said manual selector means being operable to engage said mechanical means when desired.

14. The instrument of claim 13, wherein the pendulum includes an extendable suspension spring connected to the housing, and the mechanical means comprising lever means connected to the manual selector means for engaging and pulling down the pendulum when parallel projection is desired, and including registry receptor surfaces on a lower side of the pendulum and corresponding precision rest stop surfaces connected to the housing below the pendulum, such that when pulled down the pendulum seats with its registry receptor surfaces firmly against the precision rest stop surfaces, establishing parallel projection of the beam.

15. The instrument of claim 13, wherein the pendulum includes a bearing suspension in the housing, such that the pendulum is non-extendable in the housing, and wherein the mechanical means for locking the pendulum comprises a moveable mechanical latch for engaging the pendulum in a fixed position wherein the beam is parallel to the reference surface.

* * * * *